Aug. 11, 1936.   H. DALLMANN ET AL   2,050,878
MEASURING DEVICE
Filed Feb. 15, 1935
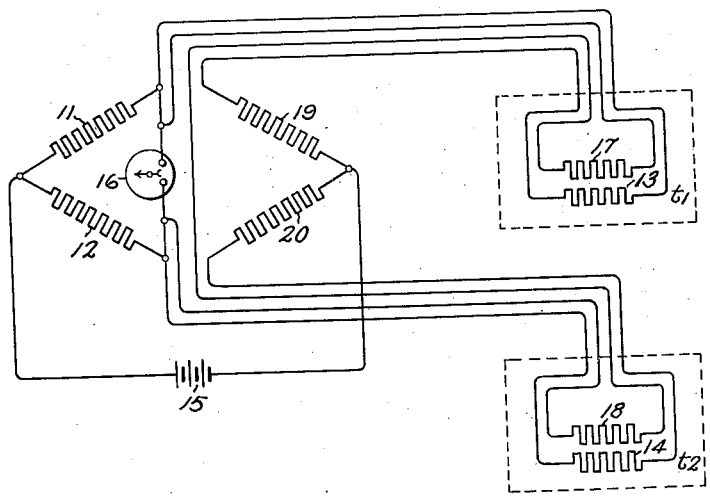
Inventors:
Herbert Dallmann,
Hermann R.Eggers,
by Harry E. Dunham
Their Attorney.

Patented Aug. 11, 1936

2,050,878

UNITED STATES PATENT OFFICE 2,050,878

MEASURING DEVICE

Herbert Dallmann, Berlin-Karlshorst, and Hermann Ragnar Eggers, Berlin, Germany, assignors to General Electric Company, a corporation of New York Application February 15, 1935, Serial No. 6,648
In Germany April 25, 1934

2 Claims. (Cl. 73—32)

Our invention relates to improvements in measuring devices and has for its principal object the measurement of temperature differences independently of variations in the individual temperatures or in the average temperature. Other and further objects and advantages will become apparent as the description proceeds.

Resistance thermometers have been found suitable in various applications for measuring individual temperatures. If the average temperature of two points remains constant, the temperature difference can be measured by means of a Wheatstone bridge circuit having two of its arms formed by temperature-responsive resistors or resistance thermometers placed at the two points in question. However, if the individual temperatures of both points increase or decrease, both resistances will be varied even though the temperature difference may remain the same and the bridge currents will be varied, thus producing an inaccuracy in the reading.

In accordance with our invention in its preferred form, we utilize a modified Wheatstone bridge in which the galvanometer is shunted by temperature-responsive resistors subjected to the individual temperatures or to the average temperature of the points in question so that variations in the bridge current produced by variations in average temperature are compensated by variations in the division of current between the galvanometer and the shunt resistance.

The features of our invention which are believed to be novel and patentable will be pointed out in the claims appended hereto. For a better understanding of our invention, reference may be had to the following description taken in connection with the accompanying drawing, which is a circuit diagram of one embodiment of our invention.

In the drawing is shown a Wheatstone bridge having resistance arms 11, 12, 13, and 14. The arms 13 and 14 consist of temperature-responsive resistors placed at two points at which the temperatures are $t_1$ and $t_2$ respectively. The bridge current is supplied by a suitable source 15, which is connected to one pair of opposite terminals of the bridge. Measurements are made with the aid of a current responsive device such as the galvanometer 16, for example, connected to the remaining pair of terminals of the bridge as a diagonal member.

In order to compensate for variations in the average of the temperatures $t_1$ and $t_2$, two compensating resistors 17 and 18 composed of temperature-responsive resistance material are placed at the points $t_1$ and $t_2$ respectively, and connected in series in a circuit shunting the galvanometer 16. In certain cases, it may be sufficient to employ only one of the temperature-compensating resistors 17 and 18. For example, if one of the points $t_1$ is located at a place where the temperature varies relatively little, such as indoors in a heated building, and the variations in temperature at $t_2$ are very great in comparison, it will be unnecessary to provide the compensating resistor 17 because a compensating resistor, such as the resistor 18, at the point $t_2$ alone will be sufficient to compensate the galvanometer 16 within the desired degree of accuracy for variations in the total bridge current. It will be understood that the electrical dimensions of such a single compensating resistor must be suitably chosen in relation to the calibration of the galvanometer 16.

It will be apparent, in the operation of the apparatus that the difference in resistance of the resistance arms 13 and 14 will depend upon the difference between the temperatures $t_1$ and $t_2$, and the current in the galvanometer 16 will provide a measurement of the temperature difference. It will be understood that the resistances of the arms 11, 12, 13, and 14 are chosen so that the bridge is balanced when the temperatures $t_1$ and $t_2$, are equal. Assuming a given difference between $t_1$ and $t_2$, a given current will flow through the galvanometer 16. If the temperature difference remains the same but temperatures $t_1$ and $t_2$ rise or fall, the resistances of arms 13 and 14 will increase or decrease and the current supplied by the source 15 as well as that flowing across the other galvanometer diagonal of the bridge will tend to decrease or increase owing to the change in resistance of the arms 13 and 14. However, the resistances of the compensating resistors 17 and 18 will also increase or decrease so that the current shunted around the galvanometer 16 will decrease or increase to compensate for the tendency of the total current in the bridge to change.

This arrangement has the advantage that it is not necessary to compensate the entire current supplied by the source 15 but merely that flowing through the galvanometer 16. Consequently, it is unnecessary to increase greatly the power loss in resistors as would be the case if constant resistance or zero temperature coefficient resistors were connected externally of the bridge to maintain the total bridge current constant.

The amount of current which need be shunted through resistors 17 and 18 and the resistance loss in the apparatus may be still further decreased by connecting constant resistance or zero temperature coefficient resistors 19 and 20 in series with the bridge arms 13 and 14, respectively. The presence of the constant resistance resistors decreases the average resistance-temperature coefficient of each of those bridge arms with respect to the resistance-temperature coefficient of the compensating resistors 17 and 18.

In accordance with the provisions of the patent statutes, we have described the principle of operation of our invention together with the apparatus which we now consider to represent the best embodiment thereof but we desire to have it understood that the apparatus shown is only illustrative and that the invention may be carried out by other means.

What we claim as new and desire to secure by Letters Patent of the United States, is:

1. Apparatus responsive to the difference in temperature between two points comprising in combination, four resistors connected in series-parallel to form a Wheatstone bridge circuit, a source of current connected to one pair of opposite terminals of said bridge, a current-responsive device connected to the two remaining terminals of the bridge and two compensating resistors connected in series in a circuit shunting said current-responsive device, one of said compensating resistors and one of the bridge arms being located at one of said points, and the other of said compensating resistors and another one of the bridge arms having a connection common to said last mentioned bridge arm being located at the other of said points.

2. Apparatus responsive to the difference in temperature between two points comprising in combination a temperature-responsive resistor adapted to be placed at one of said points, a second temperature-responsive resistor adapted to be placed at the other of said points, a pair of zero temperature-coefficient resistors, each connected in series with one of said temperature-responsive resistors to form therewith an arm of a Wheatstone bridge circuit, another pair of resistors forming the two remaining arms of a Wheatstone bridge circuit, said arms being connected in series-parallel to form the Wheatstone bridge, a source of current connected to two opposite terminals of said bridge and a current-responsive device connected between the remaining two opposite terminals of the bridge, and a temperature-responsive resistor subjected to the influence of the temperature at one of said points and connected in shunt to said current-responsive device.

HERBERT DALLMANN.
HERMANN RAGNAR EGGERS.